Nov. 17, 1931.    B. HALL ET AL    1,832,384

VARIABLE SPEED TRANSMISSION MECHANISM

Filed Oct. 6, 1923    4 Sheets-Sheet 1

Inventor
Bicknell Hall and
Edgar F. Hathaway
by Emery, Booth, Janney & Varney Attys.

Nov. 17, 1931.   B. HALL ET AL   1,832,384
VARIABLE SPEED TRANSMISSION MECHANISM
Filed Oct. 6, 1923   4 Sheets-Sheet 3

Inventor
Bicknell Hall and
Edgar F. Hathaway
by Emery, Booth, Janney & Varney Attys.

Nov. 17, 1931.  B. HALL ET AL  1,832,384
VARIABLE SPEED TRANSMISSION MECHANISM
Filed Oct. 6, 1923   4 Sheets-Sheet 4

Inventor
Bicknell Hall and
Edgar F. Hathaway
by Emery, Booth, Janney & Varney Att'ys.

Patented Nov. 17, 1931

1,832,384

UNITED STATES PATENT OFFICE

BICKNELL HALL, OF ABINGTON, AND EDGAR F. HATHAWAY, OF WELLESLEY, MASSACHUSETTS, ASSIGNORS TO HALL COMPANY, OF BOSTON, MASSACHUSETTS, A CORPORATION OF MASSACHUSETTS

VARIABLE SPEED TRANSMISSION MECHANISM

Application filed October 6, 1923. Serial No. 666,912.

This invention aims to improve transmission mechanism for converting given speed rotary motion into variable speed rotary motion.

In the accompanying drawings, which show one illustrative embodiment of our invention.

Referring to the drawings, the mechanism as a whole is supported upon a suitable base 1 provided with uprights 2, each having a bearing member 3 bolted or otherwise rigidly attached to it. As viewed in Fig. 2 the right end and the intermediate bearing members 3 are formed with inwardly projecting bosses 5 desirably carrying ball bearings or the like for rotatably supporting the heads 7 and 8 of an annular member, casing, or abutment 6, herein constituting a rotatable driving element. Said annular member is preferably formed integral with the head member 7 and is suitably secured to the head member 8, and herein serves as a pulley for a power belt, or if desired said member may be otherwise driven.

Figure 2:
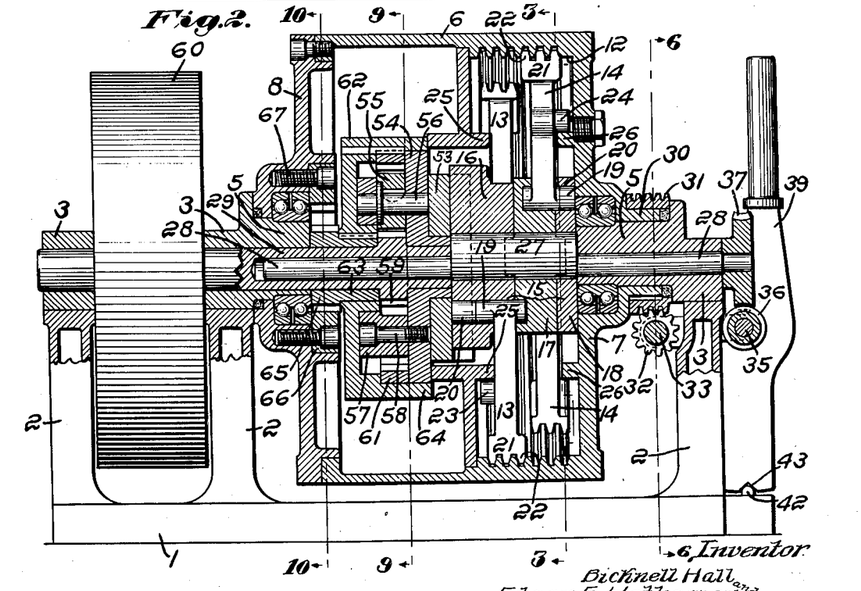
Fig. 2 is a longitudinal vertical section taken centrally through the mechanism of Fig. 1.
Figure 3:
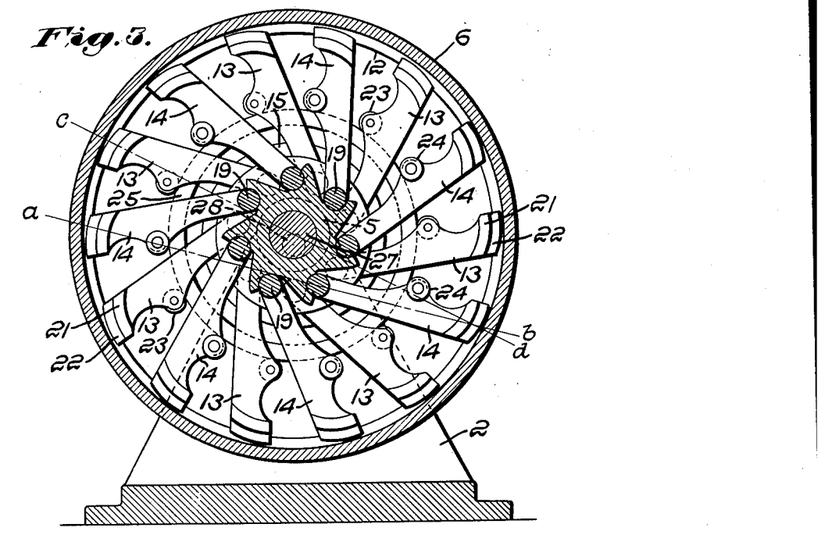
Fig. 3 is a transverse vertical section upon the line 3—3 of Fig. 2 looking in the direction of the arrows and with certain of the parts in their concentric position.
Figure 4:
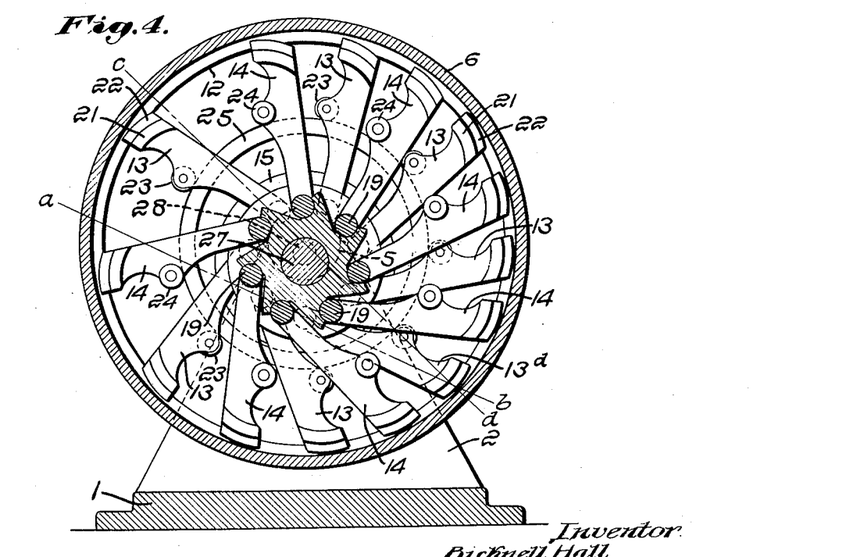
Fig. 4 is a view corresponding to Fig. 3 but with the parts in their position of maximum relative eccentricity.

In the present form of our invention, and as best seen in Figs. 3 and 4, the internal surface 12 of said annular member cooperates with driving or power transmitting members or arms. As shown, said members are arranged in two series, 13 and 14, the members of each series being distributed in a single plane circumferentially about the axes of the member 6 and of a rotatable element or ring 15, which latter for convenience in construction and assembly is shown as formed of a plurality of parts, 16, 17, and 18, (see Fig. 2). Referring again to Figs. 3 and 4, said members 13, 14 are movably connected, as by pivot pins 19, to and around said ring 15, the pins 19 of the units of one series being positioned intermediate those of the other series.

In assembling said ring and driving members, the pivot pins of the members 14 are first placed in their bearing recesses in the ring part 18, at the right in Fig. 2, and the intermediate part 17, seen in section in Figs. 3 and 4, is then positioned, and interlocked, said pins seating in the corresponding recesses in said intermediate part. The pivot pins of the other series of members 13 (see Fig. 2) are then seated in their bearing recesses in the opposite face of said intermediate part and finally the ring part 16 at the left is positioned, receiving said last mentioned pivot pins in the recesses upon its right face, and is interlocked to the intermediate part. A reverse procedure may of course be followed.

The arms 13, 14 herein function as abutment-engaging members, drivers, or pushers, operatively connecting the driving element, herein the annular member 6, and the ring 15, which latter may be termed a driven element, to which variable speed rotary motion is transmitted in a manner to be described. Any suitable plurality of arms may be provided but desirably the number is such that at all times at least one of them shall be in driving engagement with said annular member. In the present instance fourteen are shown, arranged in two series of seven each, but within the limits stated a greater or less number may be employed. Said arms herein constitute one form of what may conveniently be termed driving units.

Again referring to Figs. 3 and 4, the end of each unit carries a segmental portion or head 21 having a face adapted to abut said annular member. Said face for each unit is herein formed upon an arc, the centers of all said arcs for the respective series lying in a circle intermediate the pins 19 of each series and the surface 12 of said annular member. The cooperating faces of said driving units and said annular member are so formed, that one of them, herein said annular member, provides for each driving unit a continuous face of a length to reach from one to another of the points of intermittent driving engagement of the driving units therewith while the other, herein the driving units, provides a plurality of faces of limited extent for progressive engagement with said continuous face. Said driving unit faces and the surface 12 are circumferentially smooth and uninterrupted. In the mechanism shown said driving unit faces are provided with one or more circumferential ribs 22 and the surface 12 is correspondingly formed to receive said rib or ribs which aid in guiding the driving units; if desired said ribs may be dispensed with entirely since they are not essential in obtaining the positive driving action of our device.

To maintain the driving units 13, 14 in juxtaposition to the surface 12 said driving units are respectively provided with rollers 23 and 24 riding on guide rings 25, 26 which may be floating members, or as here shown may be rigidly supported by the annular member 6. The outer and guiding surfaces of said rings 25, 26 coincide with or are adjacent the circles above mentioned which contain the centers for the arcuate heads 21 of the driving units.

Figures 1, 1A:
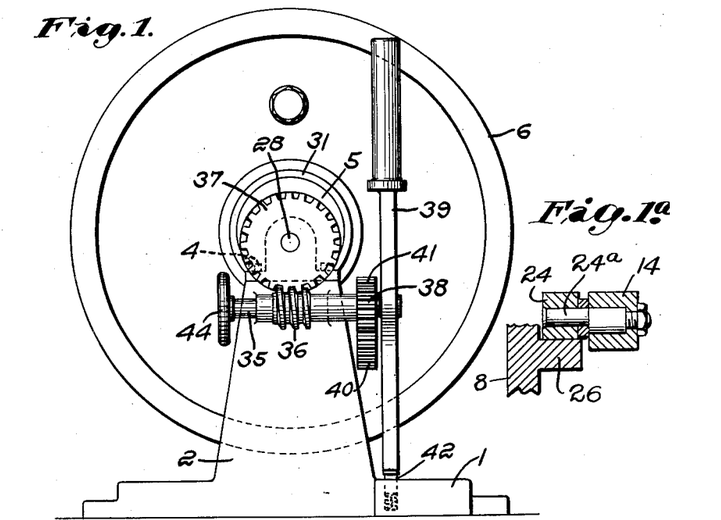
Fig. 1 is an end elevation of an apparatus embodying our invention.
Fig. 1a is a detail sectional view upon an enlarged scale of one form of guide means for the driving arms or units.

The axes of said rollers are so positioned upon the respective units and the rollers are of such diameter that said driving unit heads partake of a rolling motion in moving into and out of effective driving engagement with the surface 12, said units at the same time swinging about the points at which their rollers engage the respective guide rings. Between successive driving engagements said units may move freely and may be out of contact with said surface, but by the described means they are at all times positively maintained in juxtaposition to said surface, with which they make intermittent rolling driving engagement in all eccentric positions of adjustment of the parts. Suitable means, such as adjustable eccentric bearings 24a, Fig. 1a may be provided for adjusting the position of said rollers relative to their respective units.

Means is provided whereby the axes of the driving and driven elements, herein the member 6 and ring 15 respectively, may be adjusted into positions of greater or less relative eccentricity and herein including concentricity. Accordingly said ring (see Figs. 2, 3 and 4) is herein formed with an axial passage for a cylindrical bearing 27 carried eccentrically upon a shaft 28. Said shaft is itself eccentric and to the same extent with respect to the annular member 6, being supported at one end within the boss 5 at the right, Fig. 2, and at its opposite end within another shaft 29 eccentrically positioned within the other boss 5, at the left, Fig. 2. Said first mentioned shaft 28 is normally stationary, but may be rotated upon its own axis for purposes of adjustment.

Said ring 15, as stated, is carried by the bearing 27 upon and eccentric to said shaft 28, the latter in turn being eccentric to the same extent relative to the axis of the annular member. In one angular position of said shaft said two eccentricities will offset or neutralize each other, and the axes of said annular member and ring will accordingly be concentric. Rotation of said shaft in either direction from such neutral position will cause the axis of said ring to be moved into an eccentric position relative to the axis of said annular member, the extent of said relative eccentricity depending upon the angle through which said shaft is rotated.

Any suitable manual or automatic shift mechanism may be employed for rotating said shaft 28 to effect the above described adjustment of the relative positions of the axes of the driving and driven elements. Preferably such mechanism is power operated, and herein it is driven from a moving part of the transmission mechanism itself, one form of said mechanism being shown in Figs. 1 and 2, and in detail in Figs. 5 and 6.

Referring to the right of Figure 2, I have shown secured to the head 7 of the annular member 6 a concentric sleeve 30 upon which is fixed a worm 31 meshing beneath with a worm gear 32 fast on a shaft 33 rotatably supported by the upright 2.

Figures 5, 6:
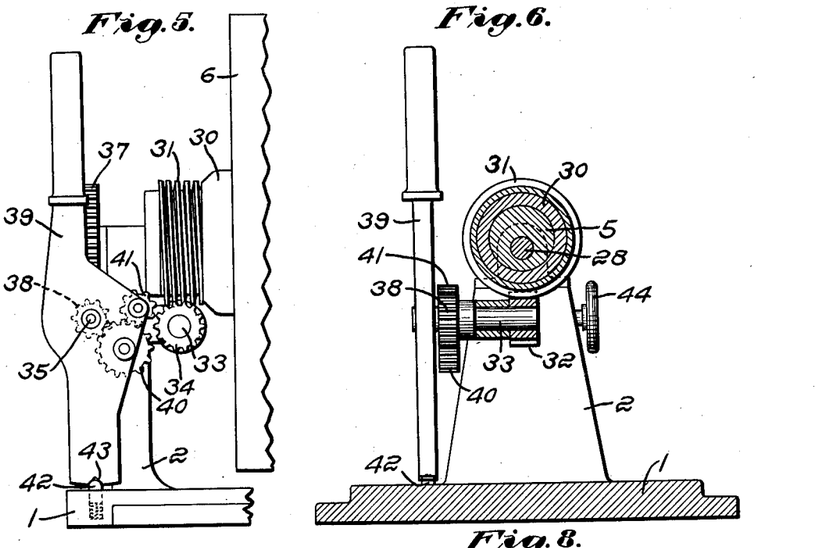
Fig. 5 is a side elevation of the shift mechanism as viewed from the right in Fig. 1.
Fig. 6 is a transverse vertical section on the line 6—6 of Fig. 2 looking to the right in said figure.

Turning now to Fig. 5, said shaft 33 also has fixed to it a pinion 34 which therefore is constantly rotated during rotation of said annular member. A cross shaft 35 supported for rotation by said upright 2 carries near its left end, Fig. 1, a worm 36 which meshes with a worm gear 37 fast on the shaft 28 which is to be rotated in one or the opposite direction. Still viewing Fig. 1 said cross shaft 35 has secured near its right end a pinion 38 and also (see Fig. 5) serves as a fulcrum for an operating lever 39 loose thereon. Pivoted upon said lever (see Fig. 5) is a pair of constantly meshing pinions 40 and 41, one of which, herein the pinion 40, is in mesh with said pinion 38 on the shaft 35. Said pinions 40 and 41 are so positioned with respect to the axis 35 of the operating lever and with respect to the pinion 34 that either the pinion 40 or 41 optionally may be moved into engagement with said pinion 34, by swinging said lever to the left or to the right respectively, Fig. 5, thereby causing the worm 36 to be turned in one or the opposite direction, with a corresponding rotation of worm gear 37 and shaft 28 to which the latter is secured.

The angular extent of such rotation of shaft 28, and the degree to which the bearing 27 for ring 15 on said shaft is accordingly thrown eccentric depends upon the length of time the pinion 40 or 41 is held in mesh with pinion 34. If desired, a suitable index may be provided, as upon the face of the worm gear 37, to determine the extent of said eccentricity. Desirably the lever 39 is held in neutral position, in which neither pinion is in mesh, by any suitable means such as the spring-pressed detent 42 seated in the base 1 and cooperating with a notch 43 in said lever.

The described adjustment of the axis of ring 15 may thus be effected by power and while the parts are in motion. If desired means such as the hand wheel 44 upon the cross shaft 35 may be provided for effecting a similar adjustment with the parts stationary.

Figure 7:
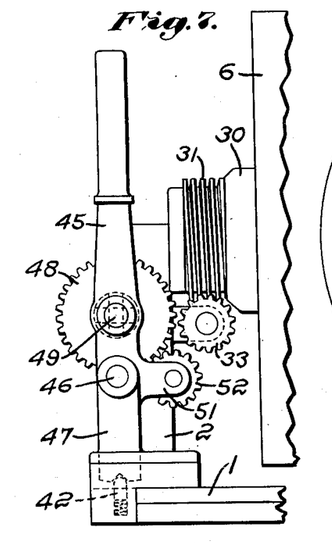
Fig. 7 is a view corresponding to Fig. 5 showing a modified form of shift mechanism.
Figure 8:
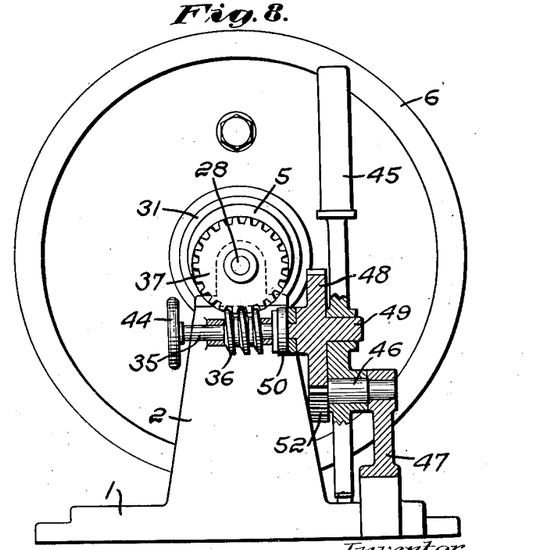
Fig. 8 is an end elevation of the mechanism shown in Fig. 7, with parts in section.

In Figs. 7 and 8 we have shown an alternative form of power shift mechanism wherein corresponding parts are similarly designated, the shiftable gear train and the operating lever however being somewhat modified. Said lever 45, Figs. 7 and 8, is mounted for rocking movement upon a pin 46 carried by a bracket 47 herein secured to the base 1. Upon said lever there is rotatably mounted at 49 a gear 48 connected through an unison ring or so-called-Oldham coupling 50 with the shaft 35 which carries the worm 36, as in Figs. 5 and 6. Said coupling compels said gear 48 and shaft 35 to rotate in unison but permits transverse movement between them.

Also upon said lever 45 is an arm 51 on which is rotatably mounted a reverse pinion 52 constantly meshing with said gear 48. Either said pinion 52 or said gear 48 optionally may be caused to mesh with the pinion 33 which, as in Figs. 5 and 6, is rotated from the annular member 6. Movement of the operating lever about its said pivot 46 in one or the opposite direction will bring either gear 48 or reverse pinion 52 into engagement with the pinion 33 thereby to rotate the shaft 28 in one or the opposite direction, as previously described in connection with Figs. 5 and 6.

Prior attempts to produce variable speed transmissions of the general type to which the present invention relates have generally proceeded upon the idea that a positive gear could only be provided by the use of pawl and ratchet or toothed driving means and that universality of variation or adjustment could only be had by the use of some form of friction clutch as a substitute for the pawl and ratchet or tooth. The objection to the pawl and ratchet or tooth type of device is, of course, that it does not present universality of adjustment; in other words, its adjustment is only from one step to another in the scale of speeds, the steps being determined by the pitch of the teeth and between such steps there is an inevitable lost motion. On the other hand the objection to a friction clutch substituted for the pawl and ratchet or tooth is that it is generally inefficient and generates heat which, if the loads be at all heavy, quickly renders the device inoperative.

But whichever type of device was employed, whether the pawl and ratchet or tooth, or its substitute, the friction clutch, driving members equipped therewith have, so far as we are advised, been positioned and made to operate along lines approximating the general alignment of the tooth or friction surface with which the pawl, tooth or friction clutch has been made to cooperate; for example, a pawl and ratchet device is not readily operative if the reciprocatory movement of the pawl is in a direction generally normal to the series of teeth with which the pawl is supposed to cooperate—the reciprocation must be in or approximating the line of the series of teeth in order that the pawl may be made to drag over the desired number of teeth and reengage in a new position relative thereto. So, also, with a friction clutch,—to render the same operative it is ordinarily necessary that the clutch device be moved along, and in the general direction of the surface with which it is to engage so that, as with the pawl, it may be moved a greater or less distance along the engaging surface and then made to grip the latter in a new position. Thus with both the pawl and the friction clutch arrangements, the effective lines of action for the individual driving members are along lines so nearly approximating the lines of the tooth series or friction surface that the relative movement is one more nearly approximating parallelism than it is of normality.

The action of the device herein disclosed, however, differs entirely from the idea of the general parallel movement between the end of the driving member—whether equipped with a pawl, a tooth, or with a friction clutch—and its cooperating member—whether toothed or smooth faced—with which it is to engage and reengage; the present device is organized to operate upon the principle of a relative movement of approach and recession of the one to or from the other in a direction normal, or substantially so, to the member with which the driving member is to engage and reengage, so that the idea of a ratchet or tooth engagement, or its equivalent a friction clutch, is entirely discarded and in lieu thereof I have employed a movement of direct approach in abutting fashion.

Thus in the illustrated mechanism here disclosed, while the driving devices or units in functioning to drive, intermittently and progressively engage the cooperating annular surface at points variously and variably distant from one another upon the circle of said annular surface, they do so by a relative movement of direct withdrawal from and approach toward said surface, in a generally normal direction, rather than in a dragging, sliding or generally parallel movement over and along said surface or its equivalent.

This difference involves an organization that will transmit the driving thrust in a direction generally radial to the engaged surface contra-distinguished to the arrangement heretofore generally attempted where the thrust has been transmitted in a generally circumferential or circular direction at a sharp angle to that of the normal.

To this end, driving devices or members are employed which, at their outer ends, make progressive intermittent and normal driving engagement in a substantially radial direction with the cooperating annular surface and which, at their inner ends, have a cranklike connection with the driven member such that the radius of the crank, herein termed the driving radius, is so short that the crank may be effectively used when in a position generally at right angles to the normal line of thrust, without loss of normality of thrust, as distinguished from a position that would be so nearly approximated to the line of true normality as to produce a toggle instead of a crank connection.

Referring now to the drawings, Figs. 3 and 4, it will be observed with reference to the illustrated mechanism herein disclosed, that the line of thrust, which is substantially in a line represented by the dot-and-dash line $a$—$b$ in Figs. 3 and 4, drawn through the point of pivotal support of a driving unit at the moment of driving and passing through the point of contact of said driving unit with the annular member, forms an angle with a radius of said annular member, indicated by the line $c$—$d$, Figs. 3 and 4, drawn through said point of contact, which angle is always less than or within the angles of repose at either side of a line normal to said annular member—for example, said line $c$—$d$. Said condition holds true whatever be the relative positions, concentric or eccentric, of the axes of the driving and driven elements. It is our present belief that the described angle may be as large as 21°, but preferably and as about herein shown it is from about 10° to about 18°. Any such line of thrust within the angles of repose at either side of a normal and which will otherwise function properly renders the device positively operative as distinguished from frictionally operative.

Contributing factors to the acuteness of said angle are the short driving radius secured through the close proximity of the pivotal connection of the driving element to the center of main rotation, that is, the axis of the driving element, and the resultant relatively great length obtained for the driving unit itself, which is preferably at least twice the length of the driving radius. As shown the ratio mentioned is approximately three to one. In other words the driving radius is the tangent of an acute angle, the latter preferably not exceeding about 21°.

So long as the driving units are arranged with the effective thrusts to fall within or between the angles of repose such lines of thrust may be said to be substantially and effectively normal to the surface of the annular member, hence during the driving period of any unit there is no slip producing component to generate heat nor is there any effective slip producing component to remove the device from the class of non-slip, direct-acting positive action, even in the presence of a suitable lubricant.

In the position shown in Figs. 2 and 3 the member 6 if rotated will cause the ring 15 also to rotate and at the same speed. The driving units are in contact with and equally spaced about surface 12 and have no movement relatively thereto, but each is drivingly effective in the same manner to transmit rotation to said ring.

When, however, said driving and driven elements are adjusted, as by rotation of the shaft 28, into a position of relative eccentricity such as seen for example in Fig. 4 the ring 15 will still be rotated but at a speed different from that of the element 6, the difference depending upon the extent or degree of eccentricity. Thus, with the ring 15 eccentrically positioned, a small number only of the driving units are progressively effective to transmit rotary movement to said ring since only the unit or units whose pivot point or points at any given instant is or are nearest to the axis of the member 6 function, and temporarily, as struts or positive drive-transmitting members to advance said ring with respect to said member. The remaining units both in advance of and behind the drivingly effective unit or units at such time merely roll and move about and upon or near the surface 12 without driving function.

Said driving units thus have progressively intermittent movements of approach into and and recession from effective driving engagement with the engaged element; although always in juxtaposition to said surface 12, they approach and recede from it in a direction substantially normal thereto and in a rolling manner. The points of said intermittently effective driving engagement are shiftable circumferentially about the axis of main rotation by increments of any desired length, since as shown the driving units are adapted for universal driving engagement with one element, herein the driving element, that is, said driving units may engage at any point circumferentially about the axis of said element.

With the driving and driven elements eccentrically positioned, as in Fig. 4, power applied to the member 6 to rotate it in a clockwise direction viewing said figure will cause successive portions of its surface 12 to act in the manner of an abutment and to engage the driving units sequentially and intermittently presented to it and through them to rotate the ring 15 at a speed dependent upon the eccentricity of said elements and by a positive and non-slipping action. Each unit in turn receives an impulse which is transmitted through it to the ring 15 to cause the latter to rotate upon its own axis and relatively to the member 6. Each impulse transmitted by any one unit is intermittent, but is supplemented by a like impulse given to and through the next unit, a plurality of which in the mechanism shown are drivingly effective in an overlapping manner. Each succeeding unit preferably becomes active to rotate said ring at the desired speed before the preceding becomes inactive.

Referring still to an eccentric position of the parts, as in Fig. 4, it will be observed that the driving units are more closely grouped on one side of the mechanism and further spaced upon the other. The unit designated 13ᵈ in said Fig. 4 is the one at the moment most effective to drive. The driving action occurs, in the mechanism shown, upon that side of the center of the device at which the units are most closely grouped and where they normally tend to maintain contact with the engaged surface of the annular member while at the non-driving side said units may spread and lose contact with said surface without in any way affecting the driving action.

The extent of the driving or pushing movement transmitted by each driving unit and consequently the angular extent through which the ring 15 is advanced with respect to the member 6 in a given time is, as stated, dependent upon the extent of the relative eccentricity of the axes of said ring and member. The driving engagements of any one unit during one rotation of the member 6 may vary in number and duration; and the distance through which an unit is moved substantially radially in a given time increases as the relative eccentricity of said driving and driven elements is increased. Consequently the speed of rotation of the driven element is varied as compared with that of the driving element by an amount proportional to the extent of their relative eccentricity. While for the purposes of description we have referred to the annular member 6 as the driving element and the ring 15 as that from which variable speed is obtained, within the spirit of our invention the mechanism may be reversely operated.

Power may be taken from the driven ring 15 in any suitable manner. Herein for the purpose we provide a unison member 53, shown as a so-called Oldham coupling, which serves to couple said ring to a disk 54 rotatably supported upon the shaft 29 already described. Said unison member causes said disk 54 to rotate in unison with said ring, while permitting the axis of the latter to be varied transversely.

Through the mechanism thus far described we may obtain from an element rotated at a given speed any desired speed of a positively driven element from a minimum equalling that of the driving element up to a maximum prescribed only by the structural limits of the device. It is frequently unnecessary to obtain a speed less than that of the driving element. In such instances power may be taken directly from said disk 54, in any suitable manner.

At other times it may be desirable to obtain variable speeds ranging upwardly from a minimum of zero. Any suitable means may be employed to afford such minimum and for example a form of planetary gearing such as disclosed in Figs. 2, 9 and 10.

Figure 9:
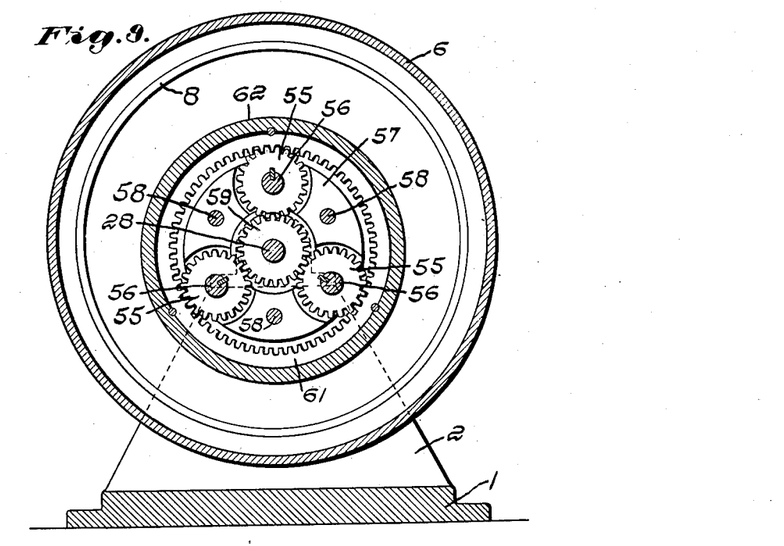
Figs. 9 and 10 are transverse vertical sections on the lines 9—9 and 10—10 of Fig. 2 respectively and looking to the left in said figure.
Figure 10:
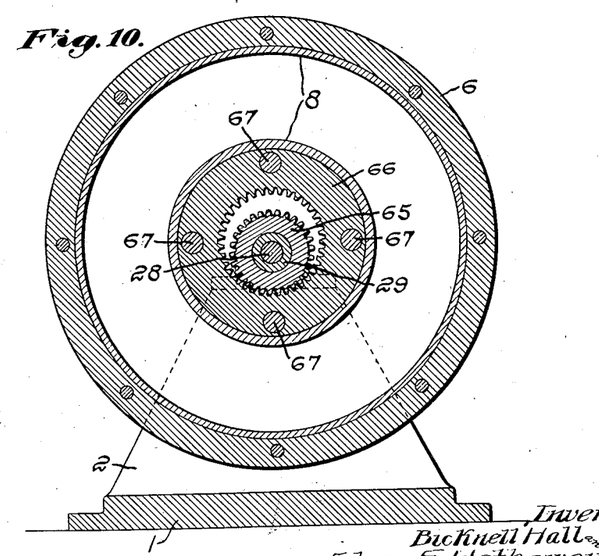

The disk 54 is constituted a carrier for one or more pinions 55 distributed about the axis of the disk, and respectively keyed upon studs 56 rotatably supported at one end in said disk. The other end of each stud 56 is journaled in a spider 57 secured to said disk as by bolts 58. Said pinions are in mesh with an external gear 59 carried by the shaft 29 already described and upon which is fixed the ultimately driven member 60.

The pinions 55 are also continuously in mesh with an annular gear 61 secured to a cage 62 having a hub 63 formed as a sleeve rotatably supported upon said shaft 29. Said cage 62 is formed with a relatively broad flange 64 extending transversely beyond the gear 61 and constituting a bearing for the disk 54.

Upon said hub 63 of the cage is carried a pinion 65 concentric with said shaft 29 and meshing with a surrounding ring gear 66 fixed centrally upon the inner face of the head 8 of the annular member 6 as by bolts or screws 67.

The relative proportions and relations of the various gears may be such that the ultimately driven member 60 remains at rest at any predetermined speed of the ring 15 relative to the driving member 6. In the present instance the construction and arrangement disclosed provides that said ultimately driven member shall remain stationary when the ring 15 and member 6 are concentric and are accordingly rotating at the same speed.

The ring gear 66 above described being carried by the member 6 rotates with it and therefore rotates the pinion 65, of smaller diameter than said gear, at a greater speed. The cage 62 and the annular gear 61 secured to it are accordingly also rotated at a greater speed than that of the member 6, and also at a greater speed than that of the ring 15 and disk 54 since, the parts being concentric, said ring and disk are rotating at the same speed as said member 6. The relative diameters of the annular gear 61 and the external gear 59 upon shaft 29 are so proportioned that with the ring 15 rotating at the speed mentioned, namely the driving speed applied to the member 6, said gear 59 remains stationary, the intermediate pinions 55 merely revolving about it without driving effect. Through the medium of the ring gear 66 rotating with the member 6 and meshing with the pinion 65, the cage 62 is rotated at the necessary excess speed above that of the disk 54 upon which the pinions 55 are carried, to effect the described result. The ultimately driven member 60 accordingly remains stationary.

In the present instance the diameter of the external gear 59 is one third the diameter of the annular gear 61 with which the pinions 55 mesh. To permit said gear 59 at times to remain stationary said annular gear should therefore be rotated at one third greater speed. Accordingly the ring gear 66 carried by the member 6, and the pinion 65 meshing with said gear are so proportioned that the said pinion is rotated one third faster than the member 6, said gear and pinion herein being provided with 36 teeth and 27 teeth respectively.

If now the ring 15 be moved into an eccentric position relative to the member 6 its speed is increased over that of said member to an extent proportional to the degree of said relative eccentricity. The disk 54 carrying the pinions 55 accordingly is rotated at an increased speed, while the speed of rotation of the annular gear 61 upon the cage remains the same. Said pinions therefore become effective to rotate the external gear 59 in the same direction as that in which the member 6 and said gear 61 are rotated.

Should the speed of the ring 15 be further increased by again increasing its eccentricity, the speed of the gear 59 and consequently of the ultimately driven element 60 also increases but at a greater rate of increase than that of said ring. When the speed imparted to said ring becomes equal to the speed of the said gear 61, then said gear pinions 55 and gear 59 upon shaft 29 rotate as a unit and the pulley 60 is therefore driven at the same speed as that of the ring. Further increased speed given to said ring by moving its axis still further eccentric to that of the member 6 will also cause said pulley 60 to receive an increased speed in the same proportion as described; said pulley will then be rotated at a speed in excess of that of the ring, which excess will be augmented proportionately as the relative eccentricity of said ring continues to be increased up to the structural limits of the mechanism. It will now be understood that the ultimately driven member 60 may be driven at any desired speed from a minimum of zero up to the maximum, and including all intermediate speeds.

Our invention is not limited to the illustrative embodiment thereof shown and described.

Claims:

1. Speed varying mechanism comprising in combination, a normally stationary shaft, a rotatable driving element surrounding the axis of said shaft, a transversely adjustable bearing upon said shaft, a driven element loose upon said bearing, and a circumferential series of driving units between said driving and driven elements and operatively connected at one of their ends with one of said elements and having intermittent, sequential, radially pressing, driving contact at the opposite end with the other of said elements whereby rotation of the driving element imparts rotation to the driven element.

2. Speed varying mechanism comprising in combination, a normally stationary shaft, a rotatable driving element surrounding the axis of said shaft, a transversely adjustable bearing upon said shaft, means to adjust said bearing, a driven element loose upon said bearing, and a circumferential series of driving units having segmental portions, said units being distributed about the axes of said elements and operatively connected with one element and having intermittent predominantly radially effective driving engagement at any point circumferentially upon the other element.

3. Speed varying mechanism comprising in combination a normally stationary shaft, a rotatable driving element surrounding the axis of said shaft, a bearing upon said shaft eccentrically positionable relatively to said driving element, a driven element rotatable upon said bearing, a circumferential series of driving units distributed about the axes of said elements, operatively connected with one element and having sequential predominantly radially pressing driving engagement at any point circumferentially upon the other element thereby to rotate said driven element at a speed differing from that of the driving element in proportion to the relative eccentricity of said elements.

4. Speed varying mechanism comprising in combination rotatable driving and driven elements, a series of driving units movably attached to one element and each having an arcuate face for driving contact with and about the other element, an annular guiding face on or adjacent which are the centers from which said arcuate faces are struck and means upon each unit cooperating with said guiding face to maintain the units in juxtaposition to the contacted element.

5. Speed varying mechanism comprising in combination rotatable driving and driven elements relatively adjustable eccentrically, a series of driving units movably attached to one element and having substantially radially pressing driving contact with the other and positive means to maintain said units in juxtaposition to the contacted element.

6. Speed varying mechanism comprising in combination rotatable driving and driven elements, a series of driving units movably attached to one element and having substantially radial driving contact with and about the other element, a guide having an annular surface concentric with said contacted element, and means upon said units for co-operation with said guide.

7. Speed varying mechanism comprising in combination rotatable driving and driven elements, means to vary their axial relation, a series of driving units movably attached to one element and having substantially radial driving contact with and about the other, guiding means for said units, and rollers upon said units cooperating with said means.

8. Variable speed transmission mechanism comprising in combination rotatable driving and ultimately driven elements, an intermediate rotatable member, said driving element and rotatable member being relatively adjustable eccentrically, substantially radially thrusting connections between said driving element and rotatable member for rotating the latter at the same or increased speeds relative to the driving element, and means connecting said driving element, rotatable member and ultimately driven element whereby the latter may be driven at any desired speed from zero to maximum, said means providing zero speed for the ultimately driven element when said driving element and rotatable member are rotating at the same speeds.

9. Variable speed transmission mechanism comprising in combination rotatable driving and ultimately driven elements, an intermediate rotatable member, said driving element and rotatable member being relatively adjustable eccentrically, substantially radially thrusting connections between said driving element and rotatable member for rotating the latter at given or increased speeds relative to the driving element, and planetary gear mechanism connecting said driving element, rotatable member and ultimately driven element whereby the latter may be driven at any desired speed from zero to maximum said planetary gear mechanism causing the ultimately driven element to remain at rest when the driving element and said rotatable member are rotating at the same speeds.

10. Variable speed transmission mechanism comprising in combination rotatable driving and ultimately driven elements, an intermediate rotatable member, said driving element and rotatable member being relatively adjustable eccentrically, substantially radially thrusting connections between said driving element and rotatable member for rotating the latter at a given or increased speed relative to the driving element, a gear constantly driven by said driving element, a second gear fixed upon said ultimately driven element and one or more rotatable pinions intermediate and meshing with both said gears and adapted to be revolved about the axes thereof by said intermediate rotatable member.

11. Speed varying mechanism comprising in combination rotatable driving and driven elements one of which has a bearing adjustable eccentrically relatively to the other element, a series of driving units movably attached to one element and having driving engagement with the other, and means to effect said adjustment of said bearing in one or an opposite direction including a gear actuated by said driving element, an adjusting shaft connected to said bearing, a pinion upon said shaft, and shiftable gearing between and adapted to connect said gear and pinion to rotate the latter in one or the opposite direction.

12. Speed varying mechanism comprising in combination rotatable driving and driven elements one of which has a bearing adjustable eccentrically relatively to the other element, a series of driving units movably attached to one element and having driving engagement with the other, and means to effect said adjustment of said bearing including a gear actuated by said driving element, an adjusting shaft connected to said bearing, a pinion upon said shaft, and shiftable gearing between and adapted to connect said gear and pinion to cause rotation of said shaft.

13. Speed varying mechanism comprising in combination a rotatable driving element, a shaft, an eccentric bearing on said shaft, a driven element rotatable on said bearing, operating connections between said elements, and means to rotate said shaft thereby to adjust said driven element eccentrically said means including a gear actuated by said driving element, a pinion connected to said shaft, and shiftable gearing connections between said gear and pinion.

14. Speed varying mechanism of universal adjustability comprising in combination rotatable elements 6 and 15, relatively adjustable eccentrically, driving units 13, 14 movably attached to said element 15 and having substantially radial driving contact with said element 6, and means 23, 24, 25, 26 to maintain said units in juxtaposition to the latter.

15. Speed varying transmission means comprising in combination a rotary driving element 6, a rotary element 60 to be driven, an intermediate rotary member 15, means for relatively adjusting said driving element and intermediate member eccentrically, connections between said intermediate member and said rotary element to be driven for effecting said adjustment, strut-like driving connections 13, 13, etc., 14, 14, etc., between said driving element and intermediate member for rotating the latter at the same or increased speed with regard to the former depending upon the relative position of their axes, a gear 61 actuated by said driving element, a second gear 59 connected with said element to be driven, and one or more pinions 55 meshing with both said gears and revoluble about the axes thereof by said intermediate rotary member 15.

16. Speed varying transmission means comprising in combination a rotary driving element 6, a rotary element 60 to be driven, an intermediate rotary member 15, means for relatively adjusting said driving element and intermediate member eccentrically, connections between said intermediate member and said rotary element to be driven for effecting said adjustment, and strut-like driving connections 13, 13, etc., 14, 14, etc., between said driving element and intermediate member for rotating the latter at the same or increased speed with regard to the former depending upon the relative position of their axes.

17. Mechanism for converting given-speed rotary motion to variable speed rotary motion, comprising in combination, a rotatable driving element, a bearing element having its axis substantially parallel to that of said driving element but transversely adjustable with respect thereto, a driven element rotatable upon said bearing element, and a circumferential series of thrust-transmitting arms between said driving and driven elements and operatively connected at one of their ends with one of said elements, and having intermittent, sequential, radially pressing, driving contact at the opposite end with the other of said elements at any point circumferentially thereof, whereby rotation of the driving element imparts rotation to the driven element at speeds dependent upon the position of adjustment of the bearing element.

18. Mechanism for converting given-speed rotary motion to variable speed rotary motion, comprising in combination, an annular element, a bearing having its axis substantially parallel to that of said annular element but transversely adjustable with respect thereto, a driven element rotatable upon said bearing, and a circumferential series of thrust-transmitting arms between said annular and driven elements and operatively connected at one of their ends with the driven element, and having intermittent, sequential, radially pressing, driving contact at the opposite end with the annular element at any point circumferentially thereof, whereby rotation is imparted to the driven element at speeds dependent upon the position of adjustment of said bearing.

19. Transmission mechanism for converting given-speed rotary into variable speed rotary motion, comprising in combination an operatively associated train of elements including a rotary member, an annular member surrounding the axis thereof, an adjustable group of driving units distributed about the axis of said annular member and operatively engaged with said rotary member, means to produce relative change of position in an endless path between said annular member and said group of driving units to cause the latter progressively to make intermittent driving engagement with and about said annular member thereby to produce rotation of one of the members with which they are engaged, guiding means and means upon each driving unit having engagement therewith to cause said driving units to function uniformly.

20. Transmission mechanism for converting given-speed rotary into variable speed rotary motion, comprising in combination an operatively associated train of elements including a rotary member, an annular member surrounding the axis thereof, an adjustable group of driving units distributed about the axis of said annular member and operatively engaged with said rotary member, means to produce relative change of position in an endless path between said annular member and said group of driving units to cause the latter progressively to make intermittent driving engagement with and about said annular member thereby to produce rotation of one of the members with which they are engaged, an annular guide member and means upon each driving unit cooperating therewith positively to maintain said driving units in functioning relation.

21. Variable speed transmission mechanism comprising, in combination, a rotary element to be variably driven, an abutment element, means relatively to adjust the axes of said elements transversely, serial drive connections intermediate said elements, connected to one and engageable with the other, and having circumferentially variable positions relative thereto, and means on one of said elements for guiding said drive connections intermediate their ends during variation of their relative positions.

22. Variable speed transmission mechanism comprising, in combination, a rotary element to be variably driven, an abutment element, means relatively to adjust the axes of said elements transversely, serial driving arms intermediate said elements, connected to one and engageable with the other, and having circumferentially variable positions relative thereto, and means to adjust said arms relatively to said abutment element, in any given position of the element to which they are attached.

23. Variable speed transmission mechanism comprising, in combination, a rotary element to be variably driven, an abutment element, means relatively to adjust the axes of said elements transversely, serial driving arms intermediate said elements, connected to one and engageable with the other, and having circumferentially variable positions relative thereto, an axially fixed annular guide concentric with said abutment element, a roller upon each of said arms and cooperating with said guide to maintain said arms in functioning relation, and means for adjusting the position of said rollers.

24. In a variable speed transmission mechanism, a series of radially disposed drive units, an element to which one end of each unit is movably connected, and means including an annular member inwardly spaced from the outer ends of said units for guiding them intermediate their ends during rotary movement of the element to which they are connected, substantially as shown and described.

In testimony whereof, we have signed our names to this specification.

BICKNELL HALL.
EDGAR F. HATHAWAY.